United States Patent
Fischer et al.

(10) Patent No.: US 7,735,860 B2
(45) Date of Patent: Jun. 15, 2010

(54) INFLATOR WITH VENT

(75) Inventors: Kurt F. Fischer, Leonard, MI (US); Karl Englbrecht, Erharting (DE); Detlef Last, Muchldorf (DE)

(73) Assignee: TRW Vehicle Safety Systems Inc., Washington, MI (US)

( * ) Notice: Subject to any disclaimer, the term of this patent is extended or adjusted under 35 U.S.C. 154(b) by 443 days.

(21) Appl. No.: 11/710,198

(22) Filed: Feb. 26, 2007

(65) Prior Publication Data

US 2008/0203707 A1    Aug. 28, 2008

(51) Int. Cl.
*B60R 21/276* (2006.01)

(52) U.S. Cl. ............... 280/739; 280/742; 280/743.2

(58) Field of Classification Search ............ 280/733, 280/736, 739, 742, 743.2
See application file for complete search history.

(56) References Cited

U.S. PATENT DOCUMENTS

| | | | |
|---|---|---|---|
| 5,762,367 A | 6/1998 | Wolanin | |
| 6,409,213 B2 | 6/2002 | Webber et al. | |
| 6,422,597 B1 | 7/2002 | Pinsenschaum et al. | |
| 6,431,596 B1 * | 8/2002 | Ryan et al. | 280/739 |
| 6,454,300 B1 * | 9/2002 | Dunkle et al. | 280/742 |
| 6,513,835 B2 | 2/2003 | Thomas | |
| 6,616,184 B2 | 9/2003 | Fischer | |
| 6,736,426 B2 | 5/2004 | Winters et al. | |
| 6,746,045 B2 | 6/2004 | Short et al. | |
| 6,832,778 B2 * | 12/2004 | Pinsenschaum et al. | 280/739 |
| 6,893,041 B2 | 5/2005 | Elqadah et al. | |
| 7,055,857 B2 * | 6/2006 | Marotzke | 280/736 |
| 7,246,819 B2 * | 7/2007 | Hofmann et al. | 280/739 |
| 7,341,276 B2 * | 3/2008 | Kelley et al. | 280/736 |
| 7,377,546 B2 * | 5/2008 | Fischer et al. | 280/739 |
| 7,469,926 B2 * | 12/2008 | Lewis et al. | 280/736 |
| 2004/0012180 A1 * | 1/2004 | Hawthorn et al. | 280/739 |
| 2005/0104347 A1 * | 5/2005 | Hawthorn et al. | 280/739 |
| 2007/0085311 A1 * | 4/2007 | Hofmann et al. | 280/739 |

FOREIGN PATENT DOCUMENTS

| | | |
|---|---|---|
| DE | 10139626 | 3/2003 |
| DE | 102005022298 | 5/2006 |
| DE | 202006002496 | 8/2006 |
| EP | 1338480 | 8/2003 |
| WO | 9964273 | 12/1999 |

* cited by examiner

*Primary Examiner*—Paul N Dickson
*Assistant Examiner*—Karen Jane J Amores
(74) *Attorney, Agent, or Firm*—Tarolli, Sundheim, Covell & Tummino LLP (57) ABSTRACT

An apparatus (10) includes an inflatable vehicle occupant protection device (14) and an inflator (16) for providing inflation fluid for inflating the protection device. The inflator (16) includes an inflation fluid control structure (100). The control structure (100) includes discharge openings (116) for directing inflation fluid into an inflatable volume (72) of the protection device (14) and vent openings (118) for venting inflation fluid outside the inflatable volume. The control structure (100) also includes a vent member (132) actuatable from an open condition permitting inflation flow through the vent openings (118) to a closed condition blocking inflation fluid flow through the vent openings.

19 Claims, 6 Drawing Sheets

INFLATOR WITH VENT

FIELD OF THE INVENTION

The present invention relates to an apparatus for helping to protect an occupant of a vehicle and, more specifically, to an apparatus including an inflatable vehicle occupant protection device, such as an air bag module, that has a vent for directing inflation fluid away from the protection device.

BACKGROUND OF THE INVENTION

It is known to provide an inflatable vehicle occupant protection device for helping to protect an occupant of a vehicle. An inflatable vehicle occupant protection device may, for example, include a frontal air bag inflatable between vehicle structure, such as an instrument panel or steering wheel, and a vehicle occupant.

It may be desirable to vent inflation fluid selectively from the air bag in response to vehicle conditions, occupant conditions, or both, in order to help control deployment of the air bag. Sensed vehicle conditions may include, for example, a sensed seat position, a sensed seat weight, and a sensed seat belt buckle latch condition. Sensed occupant conditions may include, for example, a sensed occupant position.

For example, it may be desirable to vent inflation fluid from the air bag if the occupant is positioned away from a normally seated position or in a fully forward and upright seated position in the vehicle. It may also be desirable to block inflation fluid venting from the air bag if the occupant is positioned in the normally seated position in the vehicle.

SUMMARY OF THE INVENTION

The present invention relates to an apparatus that includes an inflatable vehicle occupant protection device and an inflator for providing inflation fluid for inflating the protection device. The inflator includes an inflation fluid control structure. The control structure includes discharge openings for directing inflation fluid into an inflatable volume of the protection device and vent openings for venting inflation fluid outside the inflatable volume. The control structure also includes a vent member actuatable from an open condition permitting inflation flow through the vent openings to a closed condition blocking inflation fluid flow through the vent openings.

The present invention also relates to an inflator for providing inflation fluid to an inflatable vehicle occupant protection device. The inflator includes a housing that defines an inflation fluid chamber and a gas distribution portion. The gas distribution portion is adapted to receive inflation fluid from the inflation fluid chamber and includes discharge openings and vent openings. A vent member supported in the gas distribution portion is actuatable from an open condition permitting inflation flow through the vent openings to a closed condition blocking inflation fluid flow through the vent openings.

The present invention also relates to an apparatus for helping to protect an occupant of a vehicle. The apparatus includes an inflatable vehicle occupant protection device inflatable to help protect the vehicle occupant and an inflator for providing inflation fluid for inflating the protection device. The apparatus also includes a housing for supporting the protection device and inflator in the vehicle. The inflator includes discharge openings positioned within the housing for directing inflation fluid into an inflatable volume of the protection device to inflate the protection device. The inflator also includes a portion that extends outside the housing and comprises vent openings for venting inflation fluid outside the inflatable volume of the protection device.

The present invention further relates to an apparatus for helping to protect an occupant of a vehicle. The apparatus includes an inflatable vehicle occupant protection device and an inflator for providing inflation fluid for inflating the protection device. The apparatus also includes a tether having a first end portion connected to the protection device and an opposite second end portion connected to the inflator. The tether is configured to actuate a vent for directing inflation fluid away from the protection device.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF EMBODIMENTS

Figure 1:
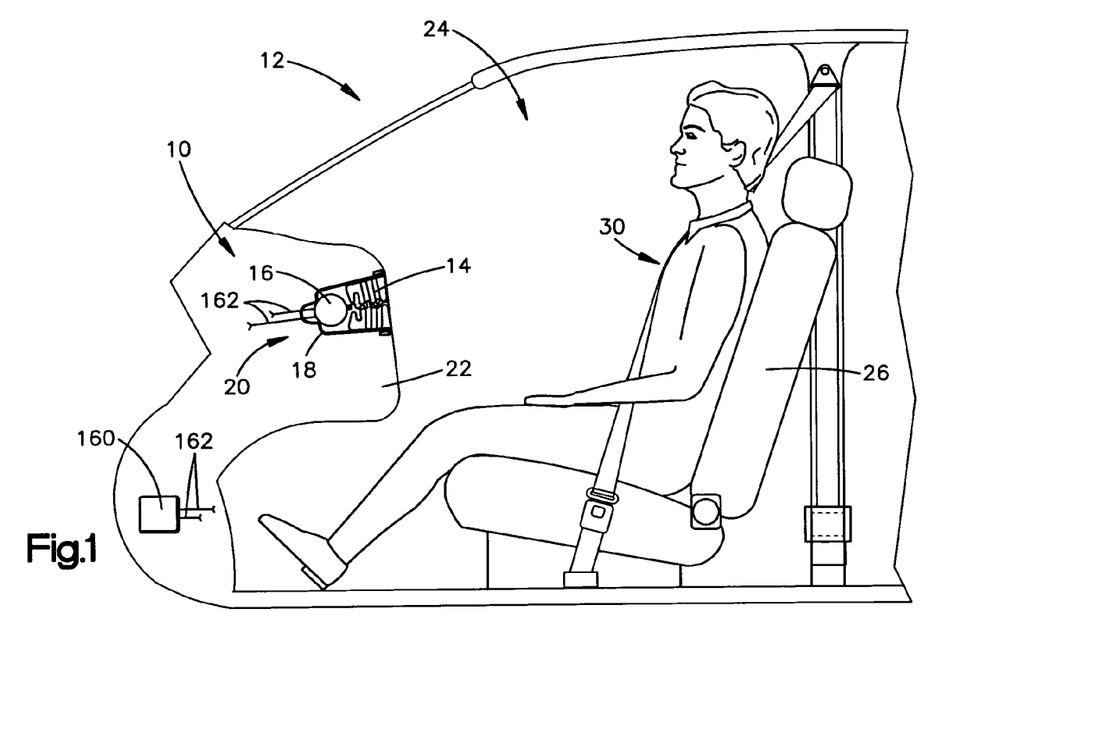
FIG. 1 is a schematic representation of an apparatus for helping to protect an occupant of a vehicle according to a first embodiment of the present invention, illustrating the apparatus in a deflated and stored condition.
Figure 2:
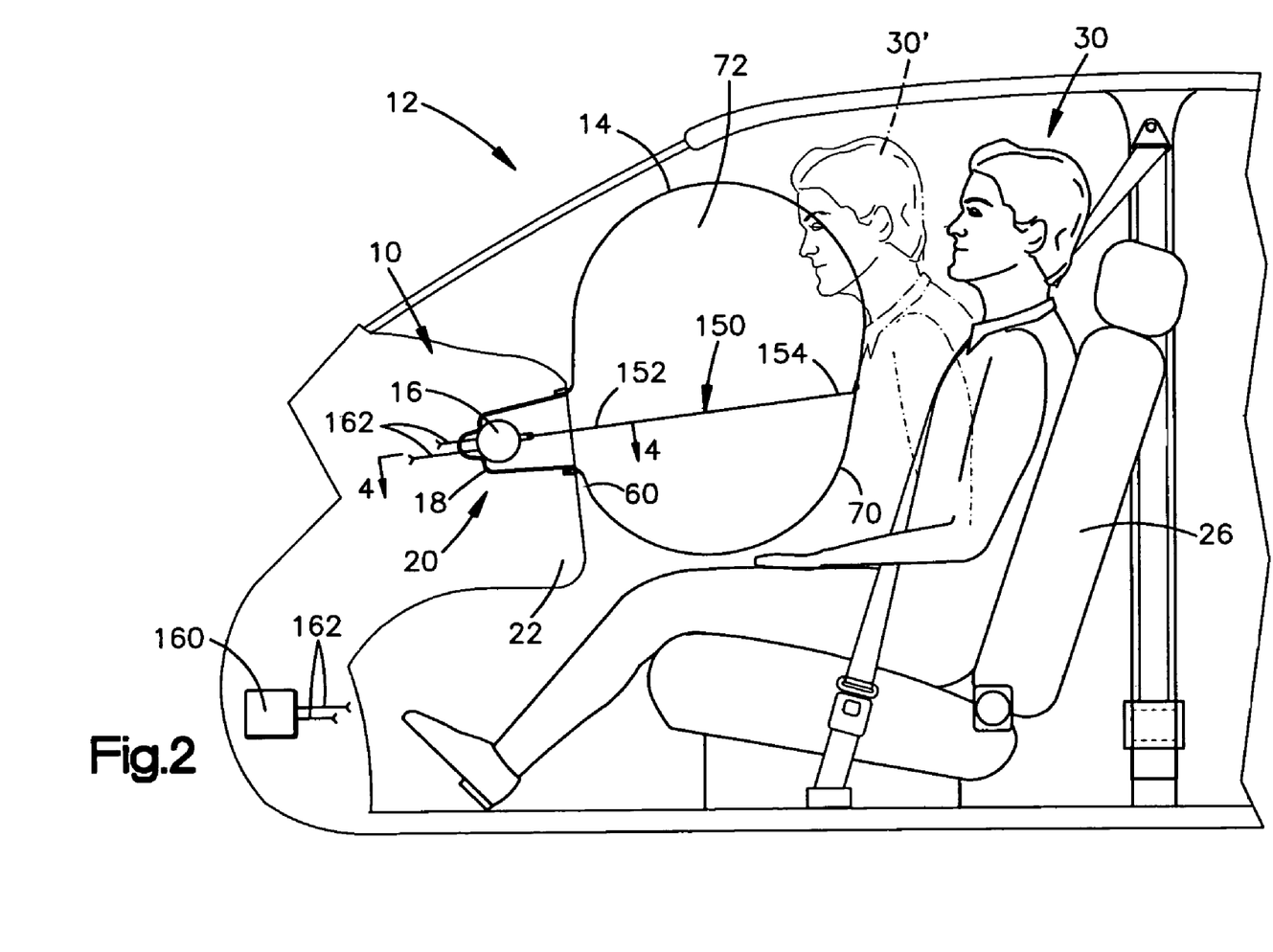
FIG. 2 is a schematic representation of the apparatus of FIG. 1 illustrating the apparatus in a first inflated and deployed condition.
Figure 3:
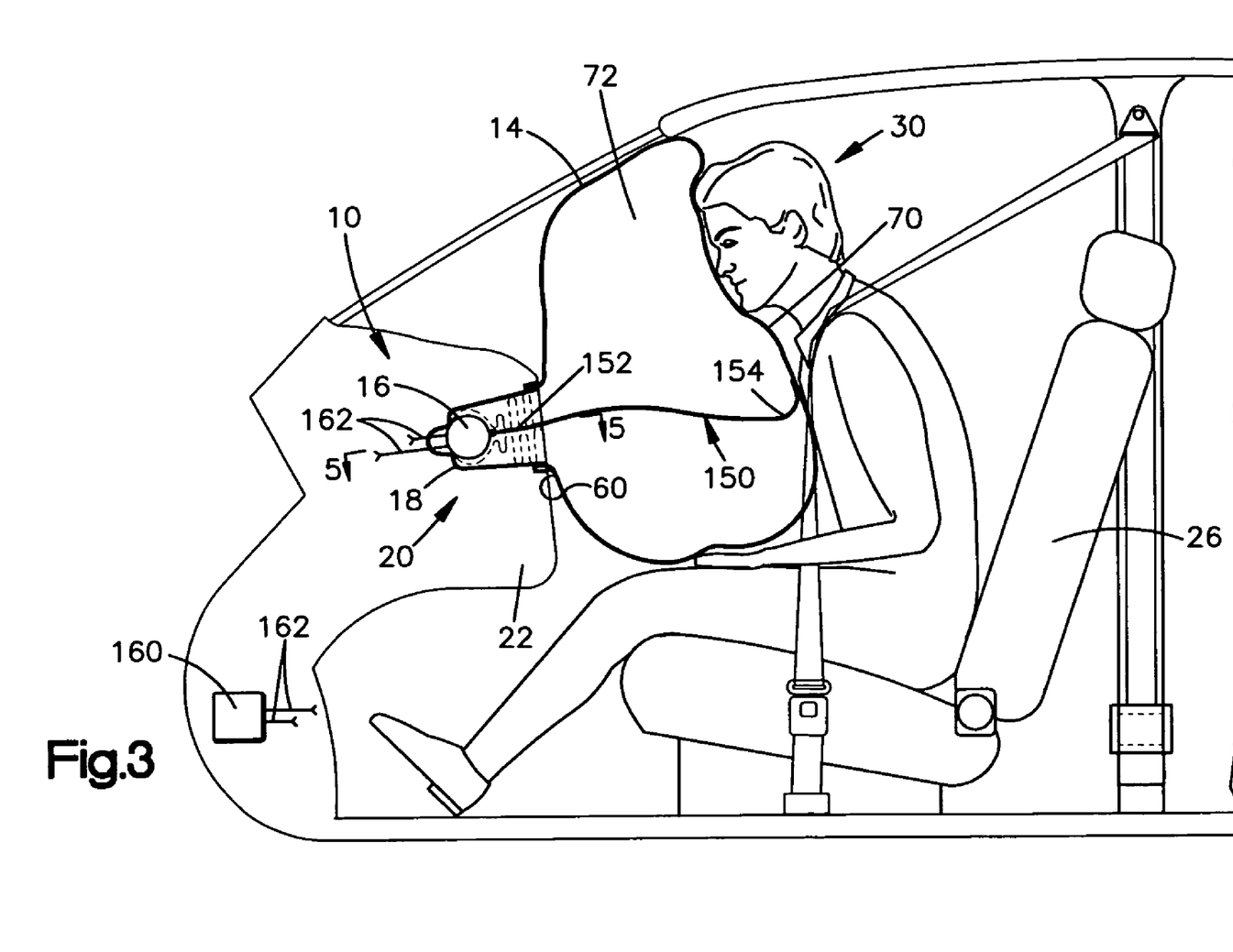
FIG. 3 is a schematic representation of the apparatus of FIG. 1 illustrating the apparatus in a second inflated and deployed condition.

Referring to FIGS. 1-3, an apparatus 10 helps protect an occupant 30 of a vehicle 12. In the embodiment illustrated in FIGS. 1-3, the apparatus comprises a frontal air bag module 20 that includes an air bag 14, an inflator 16 for providing inflation fluid for inflating the air bag, and a housing 18, such as a reaction canister, for helping to support the air bag and inflator in the vehicle 12. The air bag module 20 illustrated in FIGS. 1-3 is a frontal passenger air bag module mounted in an instrument panel 22 on a passenger side 24 of the vehicle 12. The air bag module 20 could, however, have an alternative configuration. For example, the air bag module 20 could be a frontal driver air bag module mounted on a vehicle steering wheel (not shown) on a driver side of the vehicle 12.

FIG. 1 illustrates the air bag 14 in a stored condition in which the air bag is deflated and packaged in the housing 18. The air bag 14 is inflatable from the stored condition of FIG. 1 to an inflated and deployed condition (FIGS. 2 and 3) for helping to protect the occupant 30 seated in a vehicle seat 26.

In the inflated and deployed condition of FIG. 2, the occupant 30 is illustrated in solid lines positioned in a normally seated position at the time an event triggering actuation of the apparatus 10 occurs. This allows the air bag 14 to reach the fully inflated and deployed condition of FIG. 2. In response to the event, the occupant 30 may move from the normally seated position into engagement with the fully inflated air bag 14, as indicated generally at 30' in FIG. 2.

In the inflated and deployed condition of FIG. 3, the occupant 30 is illustrated as being positioned away from the normally seated position at the time an event triggering actuation of the apparatus 10 occurs. This may be the case, for example, where the occupant 30 is leaned forward (as shown in FIG. 3) or where the occupant is seated in a full forward and upright position of the vehicle seat 26 when the event occurs.

Figure 4:
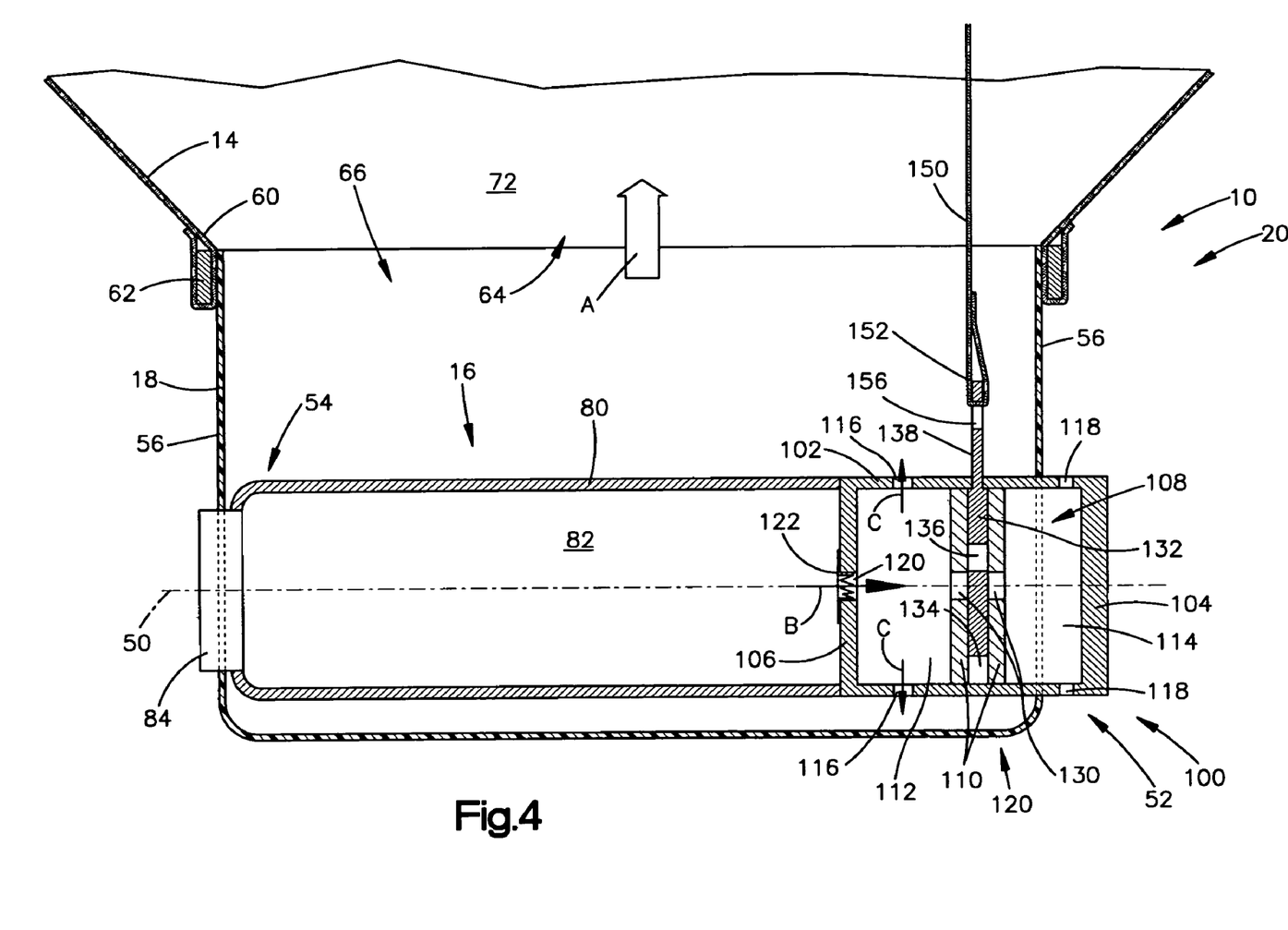
FIG. 4 is a schematic sectional view taken generally along line 4-4 in FIG. 2.
Figure 5:
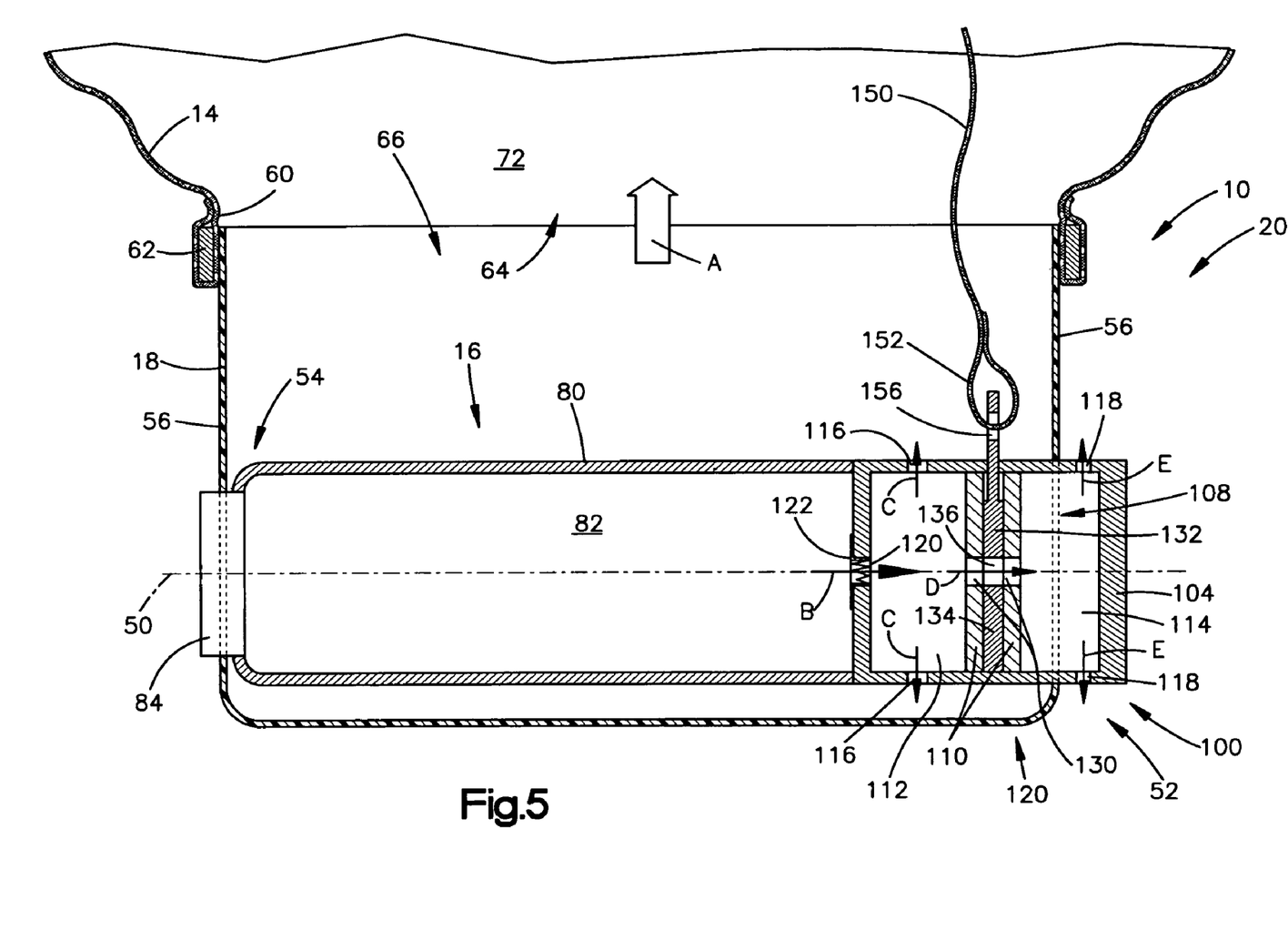
FIG. 5 is a schematic sectional view taken generally along line 5-5 in FIG. 3.

The air bag module 20 may have any desired construction or configuration. An example of the construction of the air bag module 20 is illustrated schematically in greater detail in FIGS. 4 and 5. In the configuration of FIGS. 4 and 5, the inflator 16 has a generally cylindrical configuration and is supported in the reaction canister 18 with a longitudinal axis 50 of the inflator extending transverse, e.g., generally perpendicular, to a deployment direction (indicated generally by the arrow A) of the air bag 14. The inflator 16 has opposite first and second end portions 52 and 54 that project through respective openings in opposite side walls 56 of the reaction canister 18.

The air bag 14 has a mouth portion 60 secured to the reaction canister 18 by means 62, such as a retainer ring. The mouth portion 60 defines an inflation fluid opening 64 through which the air bag 14 may receive inflation fluid from the inflator 16 via an outlet opening 66 of the reaction canister 18. Opposite the mouth portion 60, the air bag 14 has an outer panel portion 70 (see FIGS. 2 and 3) that is presented toward the vehicle occupant 30 and that the occupant may engage when the air bag is in the inflated and deployed condition.

The air bag 14 may be constructed of any suitable material, such as nylon (e.g., woven nylon 6-6 yarns). The air bag 14 may have a one-piece woven construction or may include one or more pieces of material that are interconnected by suitable means, such as stitching, ultrasonic welding, heat bonding, adhesives, etc. The air bag 14 may be uncoated, coated with a material such as a gas impermeable urethane, or laminated with a material such as a gas impermeable film. The air bag 14 thus has a gas-tight or substantially gas-tight construction. Those skilled in the art will appreciate that alternative materials, such as polyester yarn, and alternative coatings, such as silicone, may also be used to construct the air bag 14.

The inflator 16 may be of any type or configuration suited to provide inflation fluid to the air bag 14. For example, the inflator 16 may be a pyrotechnic inflator that uses the combustion of gas-generating material to generate inflation fluid. As another example, the inflator 16 may contain a stored quantity of pressurized inflation fluid (not shown) in the form of a gas for inflating the air bag 14. As another example, the inflator 16 may contain a combination of pressurized inflation fluid and ignitable material for heating the inflation fluid. As a further example, the inflator 16 may be of any suitable type or construction for providing inflation fluid to inflate the air bag 14.

The inflator 16 may also have any construction suited to provide inflation fluid to the air bag 14. In the embodiment illustrated in FIGS. 4 and 5, the inflator 16 includes a housing 80 that helps define an inflation fluid chamber 82 for storing inflation fluid or inflation fluid generating materials. The second end portion 54 of the inflator 16 comprises an end cap 84 secured to the housing by known means (not shown) such as a weld (e.g., a capacitor discharge (CD) or friction weld). The end cap 84 projects through the side wall 56 of the reaction canister 18 and thus may help secure the inflator to the reaction canister. The housing 80 and end cap 84 have generally cylindrical configurations and are aligned with each other along the axis 50.

According to the present invention, the inflator 16 includes an inflation fluid control structure 100 for selectively venting inflation fluid from the air bag 14. By "venting," it is meant that the inflation fluid control structure 100 may direct or divert inflation fluid outside the inflatable volume 72 of the air bag 14.

In the embodiment illustrated in FIGS. 4 and 5, the inflation fluid control structure 100 occupies the first end portion 52 of the inflator 16 and is aligned with the housing 80 and end cap 84 along the axis 50. The control structure 100 is secured to the housing by known means (not shown) such as a weld (e.g., a CD or friction weld). The control structure 100 extends through the side wall 56 and thus may help support the inflator in the reaction canister 18.

The control structure 100 includes a cylindrical side wall 102, a first end wall 104, and an opposite second end wall 106 that together help define a chamber 108. The first end wall 104 also helps define a terminal end of the inflator 16. The second end wall 106 helps define the chamber 82. The control structure 100 includes two axially spaced vent walls 110 that divide the chamber 108 into a discharge chamber 112 and a vent chamber 114.

The side wall 102 includes discharge openings 116 that establish fluid communication between the discharge chamber 112 and the exterior of the inflator 16. The discharge openings 116 are configured to direct inflation fluid into the inflatable volume 72 of the air bag 14.

The side wall 102 also includes vent openings 118 that establish fluid communication between the vent chamber 114 and the exterior of the inflator 16. The vent openings 118 are configured to direct inflation fluid outside the inflatable volume 72 of the air bag 14. In the embodiment illustrated in FIGS. 4 and 5, the vent openings 118 are positioned outside the reaction canister 18 and thus establish fluid communication between the vent chamber 114 and the exterior of the air bag module 20.

The second end wall 106 includes a central opening 120 that provides fluid communication between the inflation fluid chamber 82 and the discharge chamber 112. A rupturable closure member 122, such as a burst disk, blocks this fluid communication and isolates the inflation fluid chamber 82 from the discharge chamber 112 prior to actuation of the inflator 16.

The vent walls 110 include axially aligned openings 130 that provide fluid communication between the discharge chamber 112 and the vent chamber 114. An actuatable vent member 132 is disposed in a space 134 defined between the vent walls 110. The vent member 132 has a central opening 136 positioned in the space 134 and an actuator tab 138 that projects through the sidewall 102 of the inflation fluid control structure 100.

The vent member 132 is movable in the space 134 between a closed condition shown in FIG. 4 and an open condition shown in FIG. 5. In the closed condition, the opening 136 of the vent member 132 is offset axially from the openings 130 in the vent walls 110. The vent member 132 thus blocks fluid communication between the discharge chamber 112 and the vent chamber 114 when in the closed condition. In the open condition, the opening 136 of the vent member 132 is aligned axially with the openings 130 in the vent walls 110. The opening 136 thus establishes fluid communication between the discharge chamber 112 and the vent chamber 114 when the vent member 132 is in the open condition.

Referring to FIGS. 2-5, the apparatus 10 includes a tether 150 for actuating the vent member 132. The tether 150 has a first end portion 152 looped through an opening 156 in the actuator tab 138 of the vent member 132 and secured to itself (e.g., via stitching or a knot) to thereby connect the tether 150 to the vent member. The tether 150 has a second end portion 154 secured to the air bag 14 by means (not shown) such as stitching or ultrasonic welding. In the embodiment illustrated in FIGS. 2 and 3, the second end portion 154 is secured to the outer panel 70 of the air bag 14. The tether 150 could, however, be connected to the air bag 14 at alternative locations.

The tether 150 may be constructed of any material suited to perform the functions described herein. For example, the tether 150 may comprise a narrow, elongated strip of fabric material, such as a woven nylon webbing. In one particular embodiment, the tether 150 may have a width of approximately three-eighths of an inch, a thickness of approximately two millimeters, and a length dependent upon the configuration of the air bag 14.

The apparatus 10 includes a sensor 160 for sensing the occurrence of an event for which actuation of the apparatus is desired. The event may, for example, include a vehicle collision, a vehicle rollover, or both. Upon sensing the occurrence of such an event, the sensor 160 provides a signal to the inflator via lead wires 162. The inflator 16 is actuated in response to the signal and provides inflation fluid to the air bag 14. The air bag 14 deploys in the deployment direction indicated generally by the arrow labeled "A" in FIGS. 4 and 5 from the stored condition (FIG. 1) to the inflated and deployed condition (FIGS. 2 and 3). The air bag 14, when inflated, helps absorb impacts with the air bag and helps distribute the impact energy over a large area of the air bag.

The vent member 132 of the inflation fluid control structure 100 is actuatable in response to the position of the vehicle occupant 30 when the air bag 14 is inflated and deployed. More particularly, the vent member 132 is actuatable in response to whether the occupant 30 is in the normally seated position (see FIG. 2) or positioned away from the normally seated position (see FIG. 3).

Prior to deployment of the air bag 14, i.e., in the stored condition of the air bag, the vent member 132 is maintained in the open position of FIG. 5. Upon actuation of the inflator 16, the closure member 122 is ruptured and inflation fluid is directed into the discharge chamber 112 of the control structure 100 via the opening 120, as indicated generally by the arrow labeled "B" in FIGS. 4 and 5. Inflation fluid enters the discharge chamber 112 and is directed through the discharge openings 116 into the inflatable volume 72 of the air bag 14, which inflates and deploys.

Since the vent member 132 is maintained in the open condition prior to actuation, a portion of the inflation fluid initially is also directed into the vent chamber 114 via the aligned openings 130 and 136 in the vent walls 110 and vent member 132, respectively. This is indicated generally by the arrow labeled "D" in FIG. 5. This portion of the inflation fluid is vented through the vent openings 118 outside the inflatable volume 72 of the air bag 14, as indicated generally by the arrows labeled "E" in FIG. 5. Thus, during initial deployment of the air bag 14, the vent member 132 is in the open condition and the inflation fluid control structure 100 vents inflation fluid from the air bag module 20.

The air bag 14 and tether 150 are configured to selectively actuate the vent member 132 depending on the position of the occupant 30. Referring to FIG. 2, when the occupant 30 is in the normally seated position and the air bag 14 deploys, the outer panel 70 moves away from the reaction canister 80 and inflator 16 a distance sufficient to tension the tether 150. The tether 150, when tensioned, pulls on the vent member 132 and moves the vent member from the open condition of FIG. 5 to the closed condition of FIG. 4. This blocks inflation fluid flow into the vent chamber 114 and through the vent openings 118. Thus, when the occupant 30 is in the normally seated position, the inflation fluid control structure 100 blocks inflation fluid from venting from the air bag module 20.

Referring to FIG. 3, when the occupant 30 is positioned away from the normally seated position and the air bag 14 deploys, the occupant may block movement of the outer panel 70 away from the reaction canister 80 and inflator 16. In this instance, the outer panel is impeded from moving a distance sufficient to tension the tether 150. Because the tether 150 remains slacked, the vent member 132 is not pulled, remains in the open condition of FIG. 5, and continues to vent inflation fluid through the vent openings 118. Thus, when the occupant 30 is positioned away from the normally seated position, the inflation fluid control structure 100 vents inflation fluid from the air bag module 20.

Figure 6:
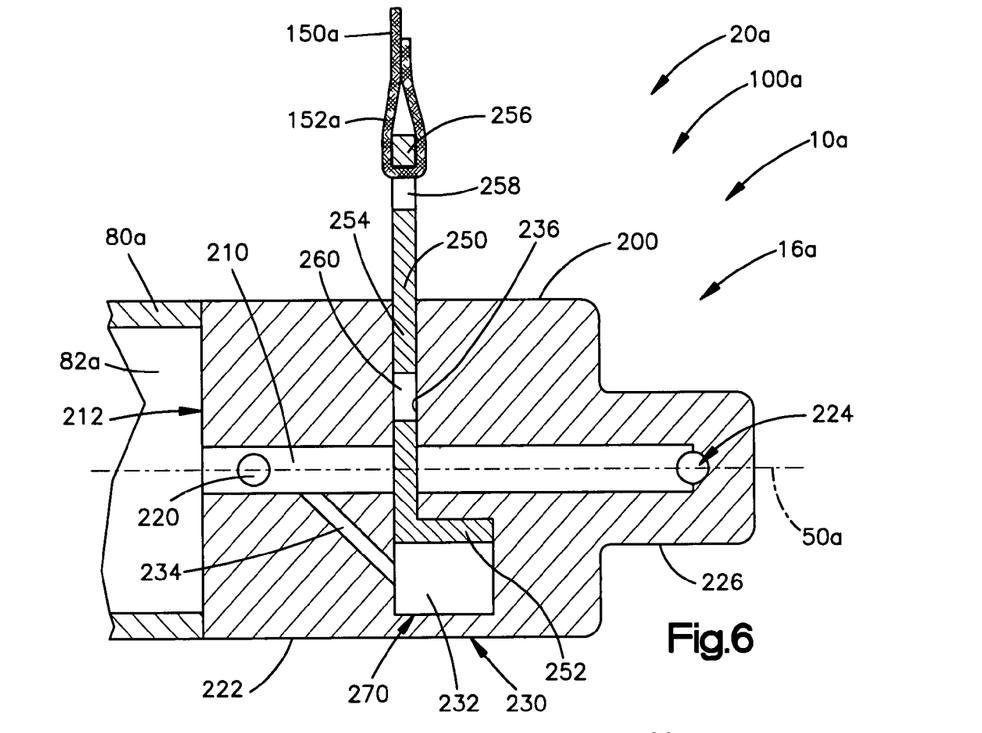
FIG. 6 is a schematic sectional view of a portion of the apparatus according to a second embodiment of the present invention, illustrating the apparatus in a condition corresponding to FIG. 2.
Figure 7:
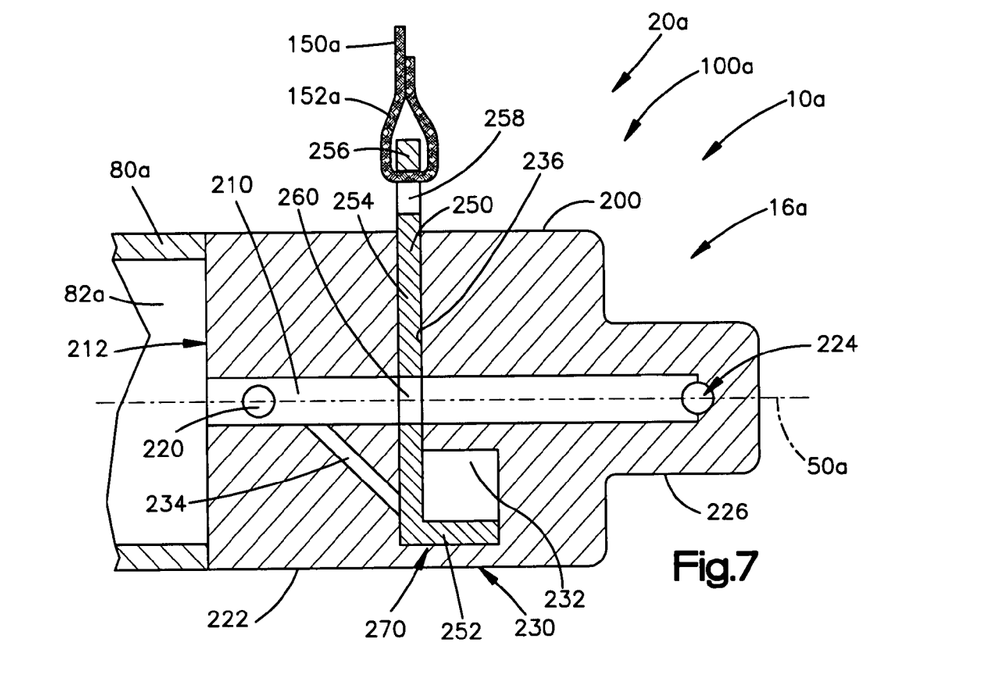
FIG. 7 is a schematic sectional view of the portion of the apparatus of FIG. 6, illustrating the apparatus in a condition corresponding to FIG. 3.

A second embodiment of the present invention is illustrated schematically in FIGS. 6 and 7. The second embodiment of the invention is similar to the first embodiment of the invention illustrated in FIGS. 4 and 5. Accordingly, numerals that are the same as to those of FIGS. 4 and 5 will be utilized in FIGS. 6 and 7 to identify similar components, the suffix letter "a" being associated with the numerals of FIGS. 6 and 7 to avoid confusion.

FIGS. 6 and 7 illustrate a portion of an air bag module 20a in accordance with the second embodiment of the present invention. Referring to FIGS. 6 and 7, the apparatus 10a comprises an inflator 16a having an inflation fluid control structure 100a with a configuration different from that of the first embodiment. The inflation fluid control structure 100a includes a housing 200 that has a main portion and an end portion. The housing has a generally cylindrical configuration with the end portion having a diameter reduced from that of the main portion. The main portion is secured to the inflator housing 80a and thus helps define the inflation fluid chamber 82a.

The control structure 100a includes a central bore 210 that extends along the axis 50a from a terminal end surface 212 of the housing 200 through the main portion and into the end portion. One or more discharge openings 220 are located in the main portion and extend radially from the central bore 210 to an outer surface 222 of the main portion. One or more vent openings 224 are located in the end portion and extend radially from the central bore 210 to an outer surface 226 of the end portion.

The control structure 100a also includes a vent member housing 230 formed in the main portion of the housing 200. The vent member housing 230 includes a vent assist chamber 232, a vent assist port 234, and a vent member sleeve 236. The vent assist chamber 232 is radially offset from the central bore 210. The vent assist port 234 extends diagonally from the central bore 210 to the vent assist chamber 232 and provides fluid communication between the central bore and the vent assist chamber. The vent member sleeve 236 extends radially into the main portion from the outer surface 222, through the central bore 210, and into the vent assist chamber 232. The vent member sleeve 236 intersects the vent assist chamber 232 at a location spaced radially inward from the location at which the vent assist port 234 intersects the vent assist chamber.

The control structure 100a further includes a vent member 250 supported in the vent member housing 230. The vent member 250 includes an assist portion 252 and a stem portion 254. The assist portion 252 is disposed in the vent assist chamber 232. The assist portion 252 has a configuration that conforms or closely matches that of the vent assist chamber 232 so that the assist portion 252 may function in the manner of a piston in the vent assist chamber 232. The stem portion 254 extends through the vent member sleeve 236 and has an actuator tab 256 that extends outside the vent member housing 230. An opening 260 extends through the stem portion 254.

The vent member 250 is movable in the vent member housing 230 between a closed condition shown in FIG. 6 and an open condition shown in FIG. 7. In the closed condition, the opening 260 of the vent member 250 is offset radially from the central bore 210 of the housing 200. The vent member 250 thus blocks fluid communication between the chamber 80a and the vent openings 224 when in the closed condition. In the open condition, the opening 260 of the vent member 250 is aligned with the central bore 210. The opening 260 thus establishes fluid communication between the chamber 80a and the vent openings 224 when the vent member 250 is in the open condition.

The apparatus 10a includes a tether 150a for actuating the vent member 250. The tether 150a has a first end portion 152a looped through an opening 258 in the actuator tab 256 of the vent member 250 and secured to itself (e.g., via stitching or a knot), thereby to connect the tether 150a to the vent member.

The tether 150a is connected to the air bag and actuates the vent member 250 of the inflation fluid control structure 100a in response to whether the occupant is in the normally seated position in a manner similar or identical to that described above in regard to the first embodiment (see FIGS. 1 and 2). The vent member 250 is maintained in the open condition (FIG. 7) prior to actuation of the inflator 16a. Thus, during initial deployment of the air bag, the vent member 250 is in the open condition and vents inflation fluid from the air bag module 20a.

If the occupant is in the normally seated position when the air bag deploys, the tether 150a is tensioned and pulls the vent member 250 to the closed condition of FIG. 6, thus blocking inflation fluid flow through the vent openings 224. The vent assist structure 270 helps maintain the vent member 250 in the closed condition, as described above. Thus, when the occupant is in the normally seated position, the inflation fluid control structure 100a blocks inflation fluid from venting from the air bag module 20a.

If the occupant is positioned away from the normally seated position when the air bag deploys, the tether 150a is not tensioned and the vent member 250 remains in the open condition of FIG. 7. Thus, when the occupant is positioned away from the normally seated position, the inflation fluid control structure 100a vents inflation fluid from the air bag module 20a.

The vent member 250, the vent assist chamber 232 and the vent assist port 234 help define a vent assist mechanism 270 of the inflation fluid control structure 100a. The vent member 250, when in the open condition (FIG. 7), blocks inflation fluid flow through the vent assist port 234. As the vent member 250 begins to move from the open condition toward the closed condition (FIG. 6) in response to tension on the tether 150a, the vent assist port 234 eventually becomes unblocked by the vent member 250. When this occurs, inflation fluid is directed through the vent assist port 234 into the vent assist chamber 232.

Inflation fluid pressurizes the vent assist chamber 232 and acts on the assist portion 252 of the vent member 250. The assist portion 252 acts as a piston and urges the vent member 250 toward the closed condition. While the vent member is in the closed condition, inflation fluid directed through the vent assist port 234 helps maintain pressurization of the vent assist chamber 232, which helps maintain the vent member 250 in the closed condition.

From the above description of the invention, those skilled in the art will perceive improvements, changes and modifications. Such improvements, changes and modifications within the skill of the art are intended to be covered by the appended claims.

Having described the invention, the following is claimed:

1. An apparatus comprising:
    an inflatable vehicle occupant protection device having an inflatable volume; and
    an inflator for providing inflation fluid for inflating the protection device, the inflator comprising an inflation fluid chamber and an inflation fluid control structure, the control structure being coaxially aligned with the inflation fluid chamber and defining an axial end portion of the inflator, the control structure having a portion positioned within the inflatable volume and a portion positioned outside the inflatable volume, the control structure comprising:
    discharge openings located in the portion positioned within the inflatable volume for directing inflation fluid into the inflatable volume of the protection device;
    vent openings located in the portion positioned outside the inflatable volume for venting inflation fluid outside the inflatable volume;
    a vent member positioned between the discharge openings and the vent openings, the vent member being actuatable from an open condition permitting inflation flow through the vent openings to a closed condition blocking inflation fluid flow through the vent openings; and
    a tether for actuating the vent member, the tether having a first end connected to the protection device and a second end connected to the vent member.

2. The apparatus recited in claim 1, wherein the vent member is actuatable in response to a position of the occupant when the protection device is inflated and deployed.

3. The apparatus recited in claim 2, wherein the vent member is actuatable to the closed condition in response to an occupant in a normally seated position, the vent member being maintained in the open condition in response to an occupant positioned away from the normally seated position.

4. The apparatus recited in claim 1, wherein the vent member is actuatable in response to deployment of the protection device.

5. The apparatus recited in claim 1, wherein the vent member is actuatable in response to tension on the tether, tension on the tether being applied when the protection device reaches a predetermined deployment position.

6. The apparatus recited in claim 1, wherein the control structure comprises a housing defining a discharge chamber including the discharge openings and a venting chamber including the vent openings, the housing comprising a wall separating the discharge chamber and venting chamber, the wall comprising a passage providing fluid communication between the discharge chamber and the venting chamber, the vent member blocking the passage in the closed condition.

7. The apparatus recited in claim 6, wherein the vent member is supported for sliding movement in the housing, the tether pulling the vent member and causing the vent member to slide from the open condition to the closed condition when the protection device reaches a predetermined deployment position.

8. An apparatus comprising:
    an inflatable vehicle occupant protection device; and
    an inflator for providing inflation fluid for inflating the protection device, the inflator comprising an inflation fluid control structure, the control structure comprising:

discharge openings for directing inflation fluid into an inflatable volume of the protection device;

vent openings for venting inflation fluid outside the inflatable volume; and a vent member actuatable from an open condition permitting inflation flow through the vent openings to a closed condition blocking inflation fluid flow through the vent openings;

wherein the control structure comprises a housing defining the discharge openings and the vent openings, the housing comprising a passage providing fluid communication between the discharge openings and the vent openings, the vent member blocking the passage in the closed condition;

wherein the control structure comprises an assist structure, the assist structure comprising an assist chamber, an assist port in fluid communication with the assist chamber, and an assist portion of the vent member disposed in the assist chamber, the assist port being configured to direct inflation fluid into the assist chamber, the inflation fluid directed into the assist chamber pressurizing the assist chamber and urging the vent member to move toward the closed condition.

9. The apparatus recited in claim 8, wherein the vent member when in the open condition blocks fluid communication between the assist port and the assist chamber, the vent member permitting fluid communication between the assist port and the assist chamber when the vent member moves a predetermined distance toward the closed condition.

10. The apparatus recited in claim 1, further comprising a housing for supporting the inflator and protection device, the discharge openings being positioned within the housing and directing inflation into the protection device through a mouth portion of the protection device, the vent openings being positioned outside the housing and directing inflation fluid outside the protection device when the vent member is in the open condition.

11. The apparatus recited in claim 1, wherein the control structure comprises an end cap of the inflator, the inflator comprising an inflation fluid chamber from which inflation fluid is discharged into the end cap upon actuation of the inflator, the end cap comprising a discharge chamber including the discharge openings and a vent chamber including the vent openings, the vent member being disposed between the discharge chamber and vent chamber, the vent member blocking inflation fluid flow from the discharge chamber to the vent chamber when in the closed condition, the vent member permitting inflation fluid flow from the discharge chamber to the vent chamber when in the open condition.

12. The apparatus recited in claim 11, wherein the discharge chamber is disposed between the inflation fluid chamber and the vent chamber, the vent chamber forming a terminal end portion of the inflator.

13. The apparatus recited in claim 12, further comprising a housing for supporting the inflator and protection device, the terminal end portion of the inflator being positioned outside the housing and directing inflation fluid outside the protection device when the vent member is in the open condition.

14. The apparatus recited in claim 1, wherein the control structure comprises an end cap of the inflator, the inflator comprising an inflation fluid chamber from which inflation fluid is discharged into the end cap upon actuation of the inflator, the end cap comprising an axially extending bore, the discharge openings and vent openings extending transverse to the bore, being in fluid communication with the bore, and being spaced apart axially along the bore, the vent member being disposed between the discharge openings and vent openings, the vent member blocking inflation fluid flow through the bore to the vent openings when in the closed condition, the vent member permitting inflation fluid flow through the bore to the vent openings when in the open condition.

15. The apparatus recited in claim 14, wherein the vent openings extend through a terminal end portion of the end cap that defines a terminal end portion of the inflator.

16. The apparatus recited in claim 15, further comprising a housing for supporting the inflator and protection device, the terminal end portion of the inflator being positioned outside the housing and directing inflation fluid outside the protection device when the vent member is in the open condition.

17. An inflator for providing inflation fluid to an inflatable vehicle occupant protection device, the inflator comprising:

a housing defining an inflation fluid chamber and a gas distribution portion, the gas distribution portion comprising a discharge chamber and a venting chamber separated by a wall having a passage that provides fluid communication between the discharge chamber and venting chamber, the gas discharge portion being adapted to receive inflation fluid from the inflation fluid chamber and direct inflation fluid through discharge openings; and a vent member supported in the gas distribution portion actuatable from an open condition permitting inflation flow from the discharge chamber through the passage, into the venting chamber and through vent openings to a closed condition blocking inflation fluid flow through the passage and thus through the vent openings.

18. An inflator for providing inflation fluid to an inflatable vehicle occupant protection device, the inflator comprising:

a housing defining an inflation fluid chamber and a gas distribution portion, the gas distribution portion comprising a discharge chamber and a venting chamber separated by a wall having a passage that provides fluid communication between the discharge chamber and venting chamber, the gas discharge portion being adapted to receive inflation fluid from the inflation fluid chamber and direct inflation fluid through discharge openings; and a vent member supported in the gas distribution portion actuatable from an open condition permitting inflation flow from the discharge chamber through the passage, into the venting chamber and through vent openings to a closed condition blocking inflation fluid flow through the passage and thus through the vent openings, wherein the gas distribution portion comprises an end cap secured to the housing, the end cap helping to define the inflation fluid chamber.

19. The apparatus recited in claim 1, wherein the vent member is located in a portion of the control structure positioned inside the inflatable volume, the tether extending within the inflatable volume from the protection device to the vent member.

* * * * *